April 11, 1933.  F. E. FINCH  1,903,621
COUNT CHECKING DEVICE FOR PACKAGED COINS
Filed May 17, 1930
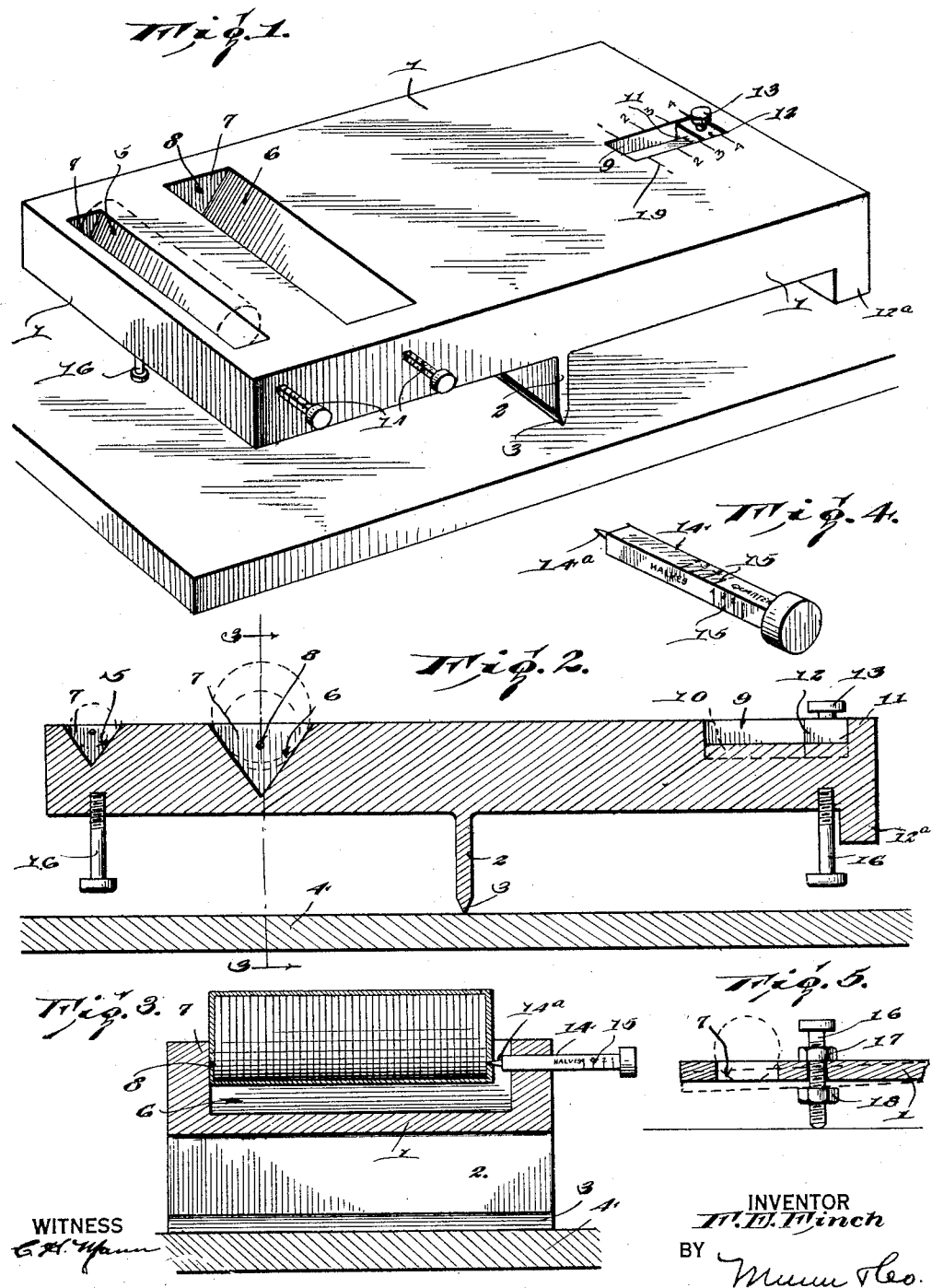
INVENTOR
F. E. Finch
BY
ATTORNEY Patented Apr. 11, 1933

1,903,621

UNITED STATES PATENT OFFICE

FRED E. FINCH, OF READING, PENNSYLVANIA

COUNT CHECKING DEVICE FOR PACKAGED COINS

Application filed May 17, 1930. Serial No. 453,325.

This invention relates to a device for checking the count of coins in the roll packages universally used today in banking and business and is more particularly concerned with a device for checking the accuracy of the count by weight without unpackaging the coins or disturbing the wrapping; and with due compensation for loss in column height or length, and weight by wear, and with the method involved therein.

Determination of accuracy of count by weight is predicated on the known fact that standard roll packages of new coins have definite weight relation; that the maximum wear in the column of coins in all or practically all standard packages will be less than the weight of one coin; and not more than three coins in the case of dimes; and that the loss in column height or length through wear, due to the absorption of more of the thickness wear by the milled beaded edges of coins, as compared to loss in weight, is substantially as four to one; and that shrinkage in length of a roll column of coins through wear from new column thickness to maximum wear thickness can be precalculated for gauging, and accurately compensated for balance.

United States coins are roll packaged in quantities of fifty "dimes," forty "quarters" and twenty half dollars. The United States fixed relative weight standard of its coins, when new, permits proportioned leverage placement of rolls of different coins relative to a pivotal balance line or point of a coin supporting and weighing table or platform and the proportionate loss of weight to height or length in a standard roll or column of worn coins, permits a proportionate adjustment of a counter balancing weight at the opposite sides of the pivotal edge or point to compensate. Where the loss in column height or length compensated by corresponding proportionate adjustment of the counter balancing weight fails to balance and the roll of coins is overbalanced by the weight adjustment, a shortage of count or inclusion of a smaller and lighter coin will be indicated. When balance is not attained with the proportionate counterbalancing adjustment made and the coin roll overbalances the counterweight, an overcount or excess in number of coins will be indicated or the inclusion of a different coin of coincident or smaller size and greater weight. In such cases, the roll package will require opening, examination and count.

A roll or column length (or height) caliper or gauge bar is used for standard coin roll packages of each denomination calibrated to indicate proportionate divisions or fractions of the maximum permissible loss of length in height, with the calibrations extending from a point indicating the full count of new coins to the point indicating the maximum loss of length or height permissible in a full count of worn coins. If the caliper or gauge may be moved appreciably toward the pivotal point, a short count will be immediately indicated, and the device embodies this quick determining means for obvious shortage as one of its features.

The described features of the invention will be more clearly apparent from the following detailed description which is to be read in conjunction with the accompanying drawing forming part thereof and illustrating one form of the device.

In the drawing:—

Figure 1 is a perspective view of a count checking platform balance embodying the features of the present invention.

Figure 2 is a longitudinal vertical section thereof.

Figure 3 is a transverse vertical section on line 3—3 of Figure 2 with the caliper bar shown in cooperative gauging relation to a roll package of coins, in this instance representing "quarters".

Figure 4 is a detail perspective view of the quarters and half dollar caliper bar.

Figure 5 is a detail section of a modification, illustrating a visual indicator hereinafter described.

In the drawing a flat rectangular plate 1 which may be of any suitable material such as wood, cast aluminum etc., is provided midway of its length with a perpendicular traversing rib 2 or any equivalent pivoting means, said rib having its lower edge beveled to a knife edge 3, and providing a transverse knife edge balance or balance line. 4 indicates a plane surface, such as a bank counter, desk or table top upon which the knife edge balance may rest.

At one side of the balancing edge, I provide the platform, plate scale or balance thus formed with troughs or receptacles for standard packages or rolls of different coins, these seats having abutments designed to engage one end of the coin roll package. Conveniently, such seats may be formed by V-shaped grooves such as the grooves 5 and 6 shown in Figs. 1 and 2, cut or cast in the top face of the plate 1 with the plate of one end of the groove forming abutments 7 for one end of the coin roll packages seating therein and, since it is desired, in accordance with my invention, to measure the length of the coin column within these packages I provide the end abutment walls 7 with inwardly facing pointed contact studs 8 of predetermined length which will penetrate the material of the coin package and engage the coin at one end of its coin column, thus making it unnecessary to disturb the wrapper of the package.

In order to provide a gauge for determining the loss of weight by wear for a full count of coins of each denomination proportioned to their loss of column length by wear, I have established by experimentation the length of the coin columns of full count packages of coins of different denominations and the maximum loss in length of full count coin columns of the same denominations through maximum permissible wear, and have determined by experiment and calculation that such coin columns lose weight in proportion to loss in column length in the ratio of approximately one to four.

The official standard weight of new United States coins makes the fifty dimes (new) contained in the standard fifty dime roll package equal in weight to twenty new quarters and ten new half dollars, and standard roll packages contain forty quarters and twenty half dollars, each, when new, weighing twice as much as the fifty new dimes. In view of this fact, I have selected the dime package as a basis of calculation and balance. The coin trough 5 is intended, in the illustrated form of my device, to seat the standard dime roll package. At the opposite side of the knife edge balance or other pivotal point of device there is provided an elongated recess 9 which, in the event of the plate 1 being made of thin metal, might well be substituted merely by a slot. The recess 9 extends longitudinally of the plate 1. The base of the recess is provided with a longitudinal rib 10 which is straddled by the bifurcated lower face 11 of an auxiliary counter weight 12. This fits the sides of the recess rather closely and has an upstanding thumb hold 13 by which it is moved back and forth.

The weight 12 supplements a permanent counter weight 12$^a$ which is made integrally with the plate 1 in any suitable manner. This main or permanent counter weight is but little less in weight than a column of fifty new dimes, which column is herein taken as a standard. The actual counter balancing action is accomplished by the auxiliary counter weight 12, and by virtue of the near balance which is arrived at by the main counter weight 12$^a$ it becomes possible to space the calibrations 19 (Fig. 1) rather far apart so that considerable leeway is allowed in making the adjustments of the auxiliary counter weight in determining a coin count.

In other words, were it not for the main counter weight 12$^a$ and the stated function which it performs, all of the balancing action would rest with the auxiliary counter weight 12 with the consequent disadvantage of having the readings along the scale 19 so narrowly spaced as to make it difficult to place the auxiliary counter weight at its settings. In practice the recess 9, or slot if that be used, will be appreciably longer than indicated. The distance between the graduations 19 will also be appreciably greater. The result is that the counter weight may be moved back and forth in proximity to the various graduations with utmost freedom without the operator having to constantly be on guard for the "breaking point" of the scale. This feature works out in practice to the extent that as much as a ½" variation will be allowed on either side of a given graduation, thus taking into account any possible variation in coin thicknesses and column weights, or in other words combinations of old and new coins in a different package. The quarter and half dollar trough 6, designed to hold standard packages of forty quarters and twenty half dollars, whose weight when new, is each twice that of the fifty new dimes, is like the dime trough in parallel to the knife edge blade 2 and is centered on a line exactly half way between the center line of the dime trough 7 and the line of the knife edge 3 so that the leverage against the weight 12 being reduced to half, the counter weight 12 in its normal position alined with calibration "4" will also balance the forty new quarters and twenty new half dollars of such standard packages. Obviously troughs for other coins may be provided, centered on that line parallel to the knife blade 2 and troughs 5 and 6 predetermined by the proportionate weight of its full count of new coins to that of the full count of new dimes, the length of the plate 1 and position of the counter weight, of course being predicated on the number of troughs used, and on the weight of plate 1 at the coin trough side of the balancing knife edge.

The calibrations 19 edging the slot 9 may be sub-divided as suggested in Fig. 1 and the top face of the counter weight 12 may have a registering line such as shown, or a pointer.

The counter edge face of the scale plate 1 in line with the coin package troughs which as shown, terminate inwardly of said edge, is bored horizontally through on the longitudinal axes of the troughs to receive and guide caliper or gauge rods or bars 14, preferably rectangular in cross section to provide a plurality of faces for calibrating and having their inner ends provided with axially and inwardly extending pointed prongs 14$^a$ of determinate length to penetrate the material of the coin package and contact the outer end coin of the coin column therein, the inner end coin being similarly contacted by the pointed ends of studs 8 at the opposite ends of the troughs. As a variation of this arrangement the calipering may be accomplished by merely graduating one or both edges of the coin troughs or receptacles a distance back from one end agreeing with columns of new and variably worn coin columns.

The lengths of the coin columns in respect to the extremes of full count new coins and full count worn coins of maximum permissible wear, are indicated by calibrations 15 determinately located on a face of the gauge bars 14 and indicating with reference to the outer edge face of the plate 1, the length of the coin column of a package with respect to proportionate degrees of loss of column length through wear up to the maximum permissible loss by wear of a full count of the particular denomination of coin.

Where, as in trough 6, packages of coins of different denominations, quarters and half dollars, are to be seated, the gauge bar 14 for that trough will have two of its faces differently calibrated, one for each coin denomination as shown in Figure 4. In case the edge graduations are employed in lieu of the bar 14, the marks would be of variable length so that quarter and half dollar denominations are readily distinguishable.

It is to be clearly understood that the indication of the gauge bar calibrations, or edge graduations, are to be read in direct combination with the auxiliary counter weight 12 in determining a coin count. The gauge bar is to be regarded as a preliminary or initial checking means on the coins solely for the purpose of establishing the fact that a given column contains new worn or mixed coins. The later adjustment of the auxiliary slidable counter weight 12 will indicate the count of coins in the package when a balance is arrived at. The gauge calibrations 15 are scaled in two or more divisions representing the relation of loss of column length to loss by weight and the calibrations edging the counter weight recess 9 are similarly scaled with the weight leverage position of the counter weight 12 in the scaled position precalculated to offset and counter balance a loss in weight by wear.

The coins of a package, if a full count, should, therefore, balance with the counter weight adjusted to the calibration proportioning the loss of weight to loss of column length and preferably indicated by a corresponding scale numeral. If, on the other hand, the coin column length loss indicated by a calibration 15 is within the maximum permissible length loss, but, the coins in the package are of mixed denomination and weights, the counter weight when adjusted to the calibration indicated by the gauge calibration for full count, will not balance the scale platform but will over or under balance. Thus a determinate accurate check of full coin count is afforded and recount of all coin roll packages is avoided, only those being recounted which gauge calibration or scale weighing indicate "short" or "long". Under balance by the counter weight when properly adjusted will indicate the presence of a heavier coin of substantially similar size and different denomination as for example a foreign coin, or a gold coin, and over balance, similarly a lighter coin.

To facilitate the operation of weighing and prevent excessive tilting on the knife edge balance, or other pivotal point, abutment studs 16 depend from the under face of the plate 1 at joints equidistant from the balancing knife edge. The double "click" or "tap" of these studs on the counter or table will furnish a quick audible signal of balance.

As a variation of the foregoing audible signal of the accomplishment of the balancing arrangement in Figure 5 may be adopted. This is a visual signal. The stud 16 (at the left) is here shown in combination with a thin scale plate 1. It is equipped with jam nuts 17, 18 which are so spaced that when the point of the stud touches the counter or table and is thereby stopped, the remaining movement of the plate 1 to the final and dotted line position will in effect make a departure of the stud 17 from the top face of the plate thus indicating to the observer that the balance has been reached. This arrangement and operation is predicated on a loose mounting of the stud 16. In practice it will be desirable to make the stud as light as possible so that there will be no chance of a false reading.

The device is relatively simple in structure and may be accurately made. Initial balance adjustment having been made, and gauging calibrations checked, there is nothing in ordinary use to breed inaccuracy. The package penetrating coin contacting tips 8 and 14$^a$ may be of or coated with wear resisting material so that their accuracy of measurement will be maintained. Means of any desired character may be used to fix and detachably maintain the counter balancing weight 12 in an adjusted position so that it will not move as the scale plate oscillates. The particular form of the device disclosed illustrates the operative principle of the invention but is intended merely as illustrative thereof and not restrictive, and may be modified in consonance with the spirit of the invention and the scope of the appended claims.

I claim:

1. A device for checking the full count of standard packages of coins by weight comprising a plate balance scale having a coin package seat thereon having a coin column end abutment, gauge means associated with said seat to initially measure the length of said column, said gauge means having associated calibrations in terms of degrees of permissible loss of column length through wear in a full count of coins of the said selected denomination up to the maximum permissible length wear for full count, and a weight on said plate opposed to said package seat normally positioned therein to counter balance the weight of a full count package of new coins of the selected denomination on said seat, and arranged for adjustment from said normal position to calibration-indicated positions coordinating and counterbalancing proportionate weight loss to the coin column length loss by wear indicated by a gauge calibration.

2. A device for checking the full count of standard packages of coins by weight comprising a plate scale having an intermediate balance point with a coin package seat on said plate at one side of said balance point, a caliper bar mounted on said plate for movement longitudinally of the coin column of a package engaging said seat at one end to engage the other end of said coin column and measure its length, said caliper bar having associated calibrations in terms of degrees of permissible loss in column length through wear in a full count of coins of the denomination being measured up to the maximum limit of wear for full count, and a counter balance on said plate at the side of said edge opposite to the coin package, normally positioned to balance the weight of a full count package of new coins of corresponding denomination and mounted for movement relatively to said balance point from position of full count new coin balance to calibration indicated positions providing counter balancing weight corresponding to the proportionate weight loss indicated by the degree of coin column length loss indicated by said caliper bar calibration reading.

3. A device for checking the full count of standard roll packages of coins by weight comprising a platform balance having a pivotal support, and a coin trough therein at one side of said pivotal support, having an abutment engaging one end of the coin package, a caliper bar mounted on said platform to slide longitudinally of the trough from one end thereof to contact the other end of the coin package and measure the length of the column of coins in said package, said caliper bar having associated calibrations in terms of degrees of permissible loss in column length by wear for a full count of the coins of the denomination being measured and cooperating with said platform to indicate the loss defining calibration, and a counter weight on said platform at the side of said pivotal support opposite to the coin package trough having a normal position relatively to said pivotal support to balance the weight of a full count package of new coins of that denomination in said trough and mounted for counter balance adjustment relatively to said pivotal support and to platform calibrations coordinating loss in weight by wear to the loss in column length by wear indicated by said caliper bar calibrations.

4. A device for checking the full count of standard coin roll packages by weight comprising a plate having an intermediate balance point and a coin roll seat thereon at one side of said balance point provided with a roll end abutment penetrating the roll and engaging the coin at one end thereof, a gauging bar mounted on said plate for sliding movement longitudinally of the coin column and having its inner end formed to penetrate the other end of the coin roll to contact the end coin therein and measure the length of the coin column, said gauge bar having associated calibrations extending from the length point of a full count column of new coins of the denominations being measured, to the length point of maximum permissible wear in said full count column and cooperating with said plate to indicate the degree of loss of length in the coin column by wear, and a weight mounted on said plate at the side of said balance point opposite to the coin roll normally positioned relatively to said balance point to balance the weight of a full count package of new coins of the denomination being measured, said weight being mounted for adjustment from said normal point toward said balance point and relatively to plate calibrations proportioning the coin weight loss compensating adjustment of said weight to the coin column length loss indicated by the gauge bar calibrations.

5. A device for checking the full count of standard roll packages of coins comprising a plate having a transverse intermediate balance line, a dime roll trough in said plate at one side of and in parallel to said balance line and determinately spaced therefrom and having an abutment engaging one end of a dime roll therein, a counter weight on said plate at the opposite side of said balance line normally positioned thereon relatively to said line to balance the weight of a full count roll of new dimes in said dime roll trough, a combined quarter and half dollar roll trough in said plate extending in parallel to said balance line and located midway between said line and dime roll trough to halve the doubled weight of standard new quarter and half dollar rolls and balance with said counter weight, said trough having an abutment to engage one end of a coin roll therein, caliper bars mounted in said plate for sliding movement longitudinally of the troughs to engage the ends of the coin rolls opposite to the trough abutments and measure the lengths of the coin columns of said rolls, said bars having associated calibrations in degrees of loss in coin column lengths from the maximum of full count new coin length to the minimum of full count worn coin length, said counter weight being mounted for adjusting movement relatively to said balance line, said plate having calibrations thereon cooperating with said counter weight and coordinated to the loss of coin column lengths indicated by bar calibrations to counter balance by calibrated adjustment of said weight the coin column weight loss proportionate to the loss in coin column length by wear.

6. A device for checking the full count of standard coin roll packages comprising a table scale having an intermediate transverse balancing line, a plurality of coin package seats thereon at one side of said balance line for standard coin packages of different denominations, a counter weight on said table at the opposite side of said balance line positioned thereon to counter balance the weight of a full count package of new coins on one of said seats with the remaining coin seats positioned in that leverage ratio to the balance line to equal the weight of their full count coin packages, through proportionate leverages, to that of the first balanced coin package of a different denomination of coin.

7. A device for checking the full count of standard coin roll packages comprising a table scale having an intermediate transverse balancing line, a plurality of coin package seats thereon at one side of said balance line for standard coin packages of different denominations, a counter weight on said table at the opposite side of said balance line positioned thereon to counter balance the weight of a full count package of new coins on one of said seats with the remaining coin seats positioned in that leverage ratio to the balance line to equal the weight of their full count coin packages, through proportionate leverages, to that of the first balanced coin package of a different denomination of coin, means for gauging the coin column lengths of coin packages on said seats and for calibrating in degrees the limits of permissible loss of column length of a full count package through wear from its full count new coin length and means for adjusting said counter weight relatively to said balance line to determine by proportion counter balancing leverage to loss of weight in a full count column of coins through wear to the extent calibrated by said gauging means.

8. In a device for checking the full count of standard packages of coins, a base providing a coin package seat and an abutment to engage one end of the column of coins in a package, and a gauge mounted on said base for movement to contact the opposite end of said coin column to measure its length, said gauge having associated calibrations to indicate the limit of reduced column length by maximum permissible wear of a full count of coins of a specific denomination from the full column length of a full count of new coins of that denomination.

9. In a device for checking the full count of standard packages of coins, a base having a coin seat thereon provided with an abutment to engage one end of a coin package and formed to penetrate the material of said package and engage the coin at one end of the coin column therein, and a gauging bar mounted on said base for movement to contact one end thereof with the opposite end of the coin package to measure the length of its coin column, said gauging bar end being formed to penetrate the material of the package to engage the coin at that end thereof, said bar having associated calibrations to indicate the limit of reduced column length by maximum permissible wear of a full count of the determination of coin being measured from the full column length of the coin column of a full count package of new coins of that denomination.

10. A device of the character described comprising a pivoted plate, means at one end of the plate for receiving a column of coins, a main counter balance at the other end of the plate being slightly less in weight than a given column of new coins of a determined denomination, an auxiliary weight movably mounted on said other end of the plate for producing an over-balancing motion of the plate in the direction of the coin column, and means movably associated with said one end of the plate, being subject to movement at the approximate completion of the overbalancing act thus to provide a visual indication of said act.

11. A device for checking the full count of coin packages comprising a plate having transverse balancing means, a dime package trough in said plate at one side of the balancing means and determinately spaced therefrom, a counterweight on said plate at the opposite side of said balancing means normally positioned thereon relatively to said balancing means to balance the weight of a full-count package of new dimes in said trough, a quarter and half dollar trough in said plate located midway between said balancing means and the dime package trough, said counterweight being mounted for adjusting movement relatively to said balancing means, said plate having calibrations cooperating with said counterweight.

FRED E. FINCH.